United States Patent Office 3,694,227
Patented Sept. 26, 1972

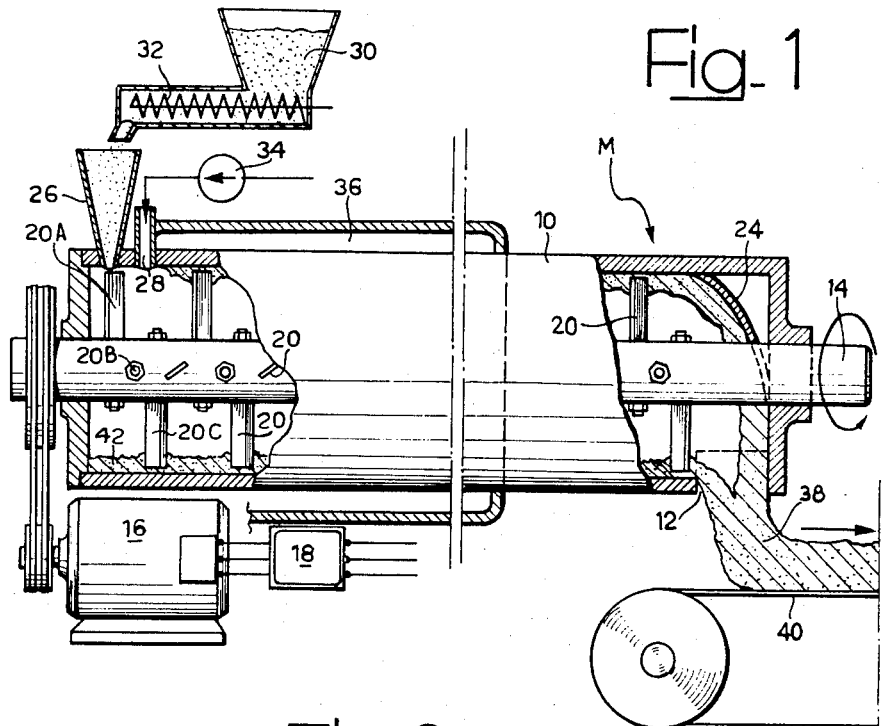
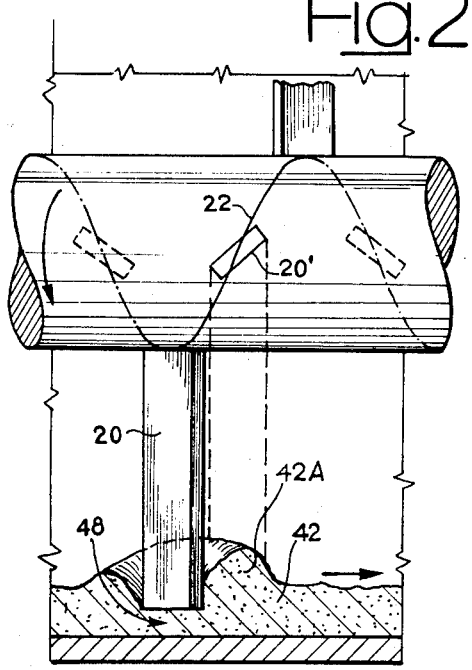
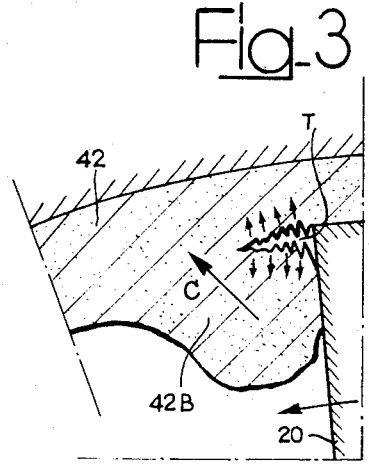

3,694,227
METHOD FOR MAKING DOUGH
Pompeo Vezzani, Via Moncalvo 60, Milan, Italy
Filed Mar. 11, 1970, Ser. No. 18,588
Claims priority, application Italy, Mar. 15, 1969,
51,012/69; June 30, 1969, 52,441/69; Oct. 14,
1969, 23,319/69; Feb. 17, 1970, 67,523/70; Feb.
18, 1970, 67,537/70, 67,538/70
Int. Cl. A21d 8/00
U.S. Cl. 99—90 CB                               7 Claims

ABSTRACT OF THE DISCLOSURE

Dough for bread products and "pasta" is continuously produced within 1 minute or less by contacting together the powdery and liquid ingredients in dispersed condition in the inlet section of a tubular continuous mixer and rotating the bladed shaft of the latter at a centrifuging speed thereby to form and maintain in the mixer a tubular liner of dough being furrowed by the tips of the blades. The speed of the shaft advantageously corresponds to a radial acceleration of 40G to 80G at the tips of the blades, G being the constant of gravity.

---

This invention relates to the art of making dough from powdery and liquid ingredients mainly consisting of cereals, flour and water.

The main object of the invention is to make in a continuous manner a dough in a condition suitable for the production of bakery products (essentially bread, cakes, biscuits and "grissini") and "pasta" (such as spaghetti and macaroni).

Several approaches have been made in the past to solve the problem of making bread and "pasta" in a continuous manner by a process in which the necessary dough is continuously prepared too. Nevertheless, this problem has not been commercially solved as yet, or solved in part only in the sense that an acceptable dough is obtained at the cost of energy- and time-consuming processing. Whereas it is an object of this invention to provide a method and an apparatus for making an excellent dough in an extremely quick manner, with a processing time of the order of a few seconds only.

It is known that grain flour (or other cereals flour) used for bakery products and "pasta" mainly consists of starch and gluten, and it is also known that an acceptable dough should contain a high amount of moisture uniformly distributed throughout the entire mass. When the flour and water are mixed together in correct proportions the "first-stage" product has the consistency of a slurry in which hydration of starch and gluten starts; a further mechanical processing of this slurry (generally for at least 20 minutes) is necessary to masticate the gluten to a point at which the slurry is converted to an "elastomeric" mass behaving like a viscous and tacky rubber compound. A proper working of this mass in a continuously operating apparatus, to which flour and water are continuously supplied at one end, proved to be very hard, also because of a great resistance opposed by the mass to flow to the discharge end of the apparatus. It is also known that the processability and flow properties of the above mass are not significantly improved by the presence of yeast (or other dough-rising agent), while, on the other hand, an additional time is notoriously necessary for a yeast-containing dough to rise. It is acknowledged here, however, that attempts have been made in the past to avoid the use of yeast (or chemical yeast-substitutes) by thoroughly permeating the mass with a suitable gas, e.g. by occluding therein myriads of bubbles of air. It is to be recalled, at this point, that the fermentation induced by the yeast in a dough is a very important factor in bread-making art because it causes a degradation of the starch yielding amylose and similar sugars which, at the baking oven temperature (about 250° C.), yield substances (dextrines) which caramelize and confer to the bread its characteristic browny crust and pleasant taste. Thus, the primary problems in preparing a bakery dough comprise, in addition to rising the dough by any known expedients, conditioning the dough to subsequently develop the said browny crust by caramelisation of amylose (rather than by merely scorching the loaf in the oven). Needless to say that, when yeast is used, the ensuing fermentation usually takes a period of time of at least one hour in controlled temperature- and relative-humidity conditions.

It has been now discovered that an excellent dough for bakery products and "pasta" can be prepared in a continuous manner within a "residence time" or "processing time" as short as 20 seconds only, and even less, irrespectively of whether or not yeast is used as dough-rising and starch-degrading agent.

Thus, in its typical aspect, this invention provides a method of continuously making dough, for bakery products and "pasta," from powdery and liquid ingredients essentially consisting of cereals flour and water, wherein:

A continuous rotary mixer is used, comprising an elongate tubular barrel, a shaft coaxial with and rotatable in the barrel, passage means for feeding the ingredients to an inlet end section of the barrel, a discharge mouth at the outlet end section of the barrel, and a plurality of blades carried by said shaft in an arrangement whereby the ingredients fed to the inlet end section of the barrel will be gathered and mixed in the barrel by said blades and the resulting mixture will be conveyed from said inlet end section towards said discharge mouth;

The said shaft is continuously rotated at a centrifuging speed, while at the same time the powdery and liquid ingredients respectively are separately fed to said inlet end section and contacted together in said section in a condition in which the ingredients are dispersed in the atmosphere in said section and are centrifuged by the blades towards the inner surface of the barrel;

The feed of the ingredients is maintained at a value insufficient for the dough being formed to fill the whole cross-sectional area of the barrel but sufficient for said dough to form on said inner surface of the barrel a tubular liner of dough furrowed by the free-end sections of the blades;

And the dough volumes forming the leading end of said liner are continuously discharged from said mouth.

As will be better explained hereinafter, the centrifuging speed of the shaft is advantageously kept at a value corresponding to a radial acceleration of 40G to 80G at the tips of the blades, G being the constant of gravity.

The invention also provides an apparatus for making dough, for bakery products and "pasta," from powdery and liquid ingredients essentially consisting of cereals flour and water, said apparatus comprising in combination:

A continuous rotary mixer comprising an elongate tubular barrel, a shaft coaxial with and rotatable in the barrel, passage means for feeding the dough-forming ingredients to an inlet end section of the barrel, a discharge mouth at the outlet end section of the barrel, and a plurality of blades carried by said shaft in an arrangement whereby the ingredients fed to the inlet end section of the barrel will be gathered and mixed in the barrel by said blades and the resulting mixture will be conveyed from said inlet end section towards said discharge mouth;

Driving means coupled with said shaft capable of rotating the latter at a centrifuging speed;

Said passage means comprising separate passages for the powdery and liquid ingredients, respectively, having associated therewith means capable of interspersing said ingredients in the atmosphere in the inlet end section of the barrel;

Metering means associated with said passages capable of feeding said powdery and liquid ingredients to their respective passages at dough-forming feed rates such that the dough being formed in the barrel will form in the latter a tubular liner furrowed by the blades.

Further details and advantages of this invention will be described hereinafter with reference to the appended drawings, wherein:

FIG. 1 schematically shows an embodiment of an apparatus for continuously making dough in accordance with this invention;

FIG. 2 is a part-view showning a blade furrowing a dough liner in the barrel;

FIG. 3 is a cross-sectional part-view on an enlarged scale, showing working conditions of a blade.

The apparatus shown in the drawings comprises a continuously operating mixer M, of a type comprising an elongate tubular bladeless barrel 10, the axis of which may be horizontal (as shown) or may slope at any desirable angle. The inner diameter of the barrel 10 is constant, but it is to be understood that, should the dough being processed undergo an exceptionally high increase in volume, the diameter of the barrel may progressively increase towards the discharge end, wherein a downwardly directed discharge mouth 12 is formed. A shaft 14 is rotatably supported on the axis of the barrel by the opposite end walls of the latter and is driven at a high speed by an electric motor 16 having associated therewith a suitable speed-control unit 18. The shaft 14 carries a plurality of radial blades 20 arranged in a relatively close mutual relationship in axial direction, the blades being preferably distributed along a helical line 22 (FIG. 2) according to concepts known in the art with a view to propel a material in the barrel towards the mouth 12. A baffle plate 24 is arranged in the discharge end section of the barrel 10 to divert the material towards the mouth.

In the apparatus shown, the passages for the powdery and liquid ingredients are represented by a hopper 26 and a nozzle 28, which are staggered lengthwise of the barrel within the length of the shaft including the first three blades 20A, 20B and 20C, these three blades forming the interspersing means for the ingredients. More particularly, it will be seen in FIG. 1 that the blade 20A rotates opposite the discharge end of the hopper 26; thus, as the shaft 14 rotates at, say, 800 r.p.m., the flour delivered by the hopper to the barrel will be violently dispersed in the inlet section of the latter by the blade 20A. Similarily, the water stream delivered through the nozzle 28 will be dispersed by the blade 20B which is next to the blade 20A and rotates opposite the nozzle, so that the particles of flour and water will contact each other in atomized condition while being at the same time centrifuged and propelled towards the discharge end of the barrel. The third blade 20C cooperates with its preceding blade 20B in dispersing water and in centrifuging and propelling the resulting mist. Flour (or an intimate mixture of flour with other powdery ingredients, such as yeast) is delivered to the hopper 26 from a container 30 by means of a metering scroll 32, while a correct proportion of water is at the same time delivered to the nozzle 28 by a suitable metering means, such as a volumetric pump 34. Depending upon the particular embodiment of the method according to this invention, the water fed to the nozzle 28 can be at room temperature or at an elevated temperature (60° to 100° C., and even up to 130° C.) and a heating jacket 36 is provided around the barrel 10 (typically around the first half or less of the length of the barrel) for high-temperature processing. A stream 38 of processed dough is continuously discharged in operation from the mouth 12 onto a conveyor belt 40 or other device arranged to convey the dough to its utilising machine (e.g. dough-divinding machine, an extruder for spaghetti, or the like). The feed of the ingredients to the barrel 10 is correlated with the progression of the dough in the barrel in a manner such that the dough being processed merely forms in the barrel a tubular liner 42 furowed by the blades 20, said liner 42 being formed and maintained by the centrifuging action of the blades on the ingredients delivered to the barrel and on the dough being formed therefrom. Owing to the "material-propelling" arrangement of the blades on their shaft 14, said liner 42 is caused to flow on the inner surface of the barrel towards the discharge mouth 12, at which the leading end volume of the liner are diverted by the baffle plate 24 and discharged through the mouth.

At this point, some considerations about the centrifuging speed of the shaft 14 are suitable for the sake of clarity.

Generally speaking, in order to obtain a centrifuging effect on a particle, it is necessary to impart to the latter a radial acceleration in excess of the gravity constant G, the latter amounting to about 9.81 m./sec.$^2$. Since, in practice, the ingredient- and dough-particles in the barrel 10 would have a tendency to accidentally stick to the shaft surface, it is advisable to adopt for the shaft (or at least for its length comprised within the barrel) a relatively large diameter and to drive it at a speed such that the radial acceleration on the shaft surface will amount to at least 5G, preferably to at least 10G. Although this measure is not strictly necessary, nevertheless it is useful to keep the shaft surface free of incrustations. However, a radial acceleration of at least 10G is necessary at the tips of the vanes in order to produce a passable result. The optimum speed of the shaft is that capable of producing a radial acceleration of 40G to 80G at the tips of the blades; beyond the 80G value the quality of the dough starts decreasing, at about 100G the quality is at its limit of acceptability, and at about 140G the dough liner 42 in the barrel is practically destroyed by excess impact applied thereto by the blades.

For example, in a typical apparatus according to this invention, the shaft 14 has a constant diameter of 30 mm. and has 60 blades helically distributed within a shaft length of 90 cm. The tip diameter of the blades is 200 mm. and the inner diameter of the barrel 10 is 206 mm. Supposing the shaft being rotated at 850 r.p.m., its angular speed results about 88 rad/sec. yielding a radial acceleration of about 110 m./sec.$^2$ (about 11G) at the surface of the shaft and a radial acceleration of about 770 m./sec.$^2$ (about 78G) at the tips of the blades. The thickness of the dough liner 42 in the barrel is from about 5 mm. at the inlet end to about 8 mm. at the discharge end. Thus, the dough liner is furrowed by the tips of the blades at a circumferential speed of about 9 m./sec. The furrowing action of a blade 20 is roughly shown in FIG. 2, from which it will also be seen that the volume 42A of dough displaced by the blade 20 in axial direction of the barrel is subsequently taken-up by a subsequent blade 20', and so on. It is thought that, in the process conditions according to this invention, each of the blades 20 operates to detach from the liner 42 a "shaving" 42B shown in FIG. 3, in which two characteristic zones may be distinguished: a zone T, adjacent the tip of the blade, wherein the dough portion between the shaving and the remaining layer is stretched (and probably ruptured, as shown), and a subsequent zone C into which the material forming the shaving 42B is thrown at a high speed of, say, 9 m./sec. with a force equalling 40–80 times the own weight of said material. As the blade reaches the zone C, the dough just compressed therein about $\frac{1}{1000}$ of second before is now tensioned, like in T, while a new compression zone is created past C, and so on throughout the entire circumference swept by the blade tip with a "frequency" of the hereinbefore exemplified value of 850 r.p.m. (corresponding to about 14 passages per second). The mass processed in this manner quickly becomes fluffy and flowable (also because of air bubbles progressively occluding therein) and, therefore, the dough liner easily travels towards the discharge mouth 12. The residence time in the mixer M may be adjusted by suitably adjusting the pitch angle of the blades and/or the slope of the axis of the mixer and/or the rotational speed of the shaft and/or the feed rate of the ingredients.

Besides the above, the very surprising result of this invention is that:

(a) The polypeptidic component (gluten) of the flour is thoroughly masticated and the elastomeric character of the dough is developed within an extremely short time, generally not exceeding 1 minute and typically amounting to 5–15 seconds;

(b) When yeast is present in the feed and the dough is processed at conventional temperatures (typically at room temperature), amylose and other saccharides necessary for subsequent caramelization are obtained in sufficient amounts from the amidaceous component (starch) of the flour substantially within the same period indicated under (a);

(c) In the absence of yeast, and by using water feed at a temperature of at least 60° C., preferably 80°–100° C., the same result is obtained as in (b) within a time period of less than about 20 seconds.

A relevant factor in the process according to this invention appears to reside in the wall thickness of the dough liner 42 and in the depth of penetration of the blades into the liner. The wall thickness of the liner depends, coeteris paribus, upon the rate of feed of the ingredients and, therefore, is easily adjustable by adjusting said rate of feed. To obtain a satisfactory quality of the dough, the wall thickness of the liner 42 should not exceed about 20% of the inner diameter of the barrel (in the cross-sectional plane in which the measures are taken) and preferably should not exceed 10% of said diameter. For example, in a mixer shown in FIG. 1, having a constant inner diameter in the range of 12 to 20 cm., values of 5 to 10 mm. may advantageously be adopted for the wall thickness of the liner 42 to obtain an excellent dough at an output in a range of about 60 to about 150 kg./hour, the length of the barrel 10 being from about 80 cm. to about 100 cm.

As to the depth of penetration of the blades into the dough liner, it is not advisable to use blades in sweeping contact with the inner surface of the barrel. Generally speaking, a gap 48 (FIG. 2) of at least 1 mm. between the blade tip and barrel is recommendable in order to obtain a satisfactory dough-stretching effect in zone T (FIG. 3). On the other hand, the blades shall not furrow the liner 42 in a superficial manner, because, in such a case, the mass of the shaving 42B will be insufficient to cause the desired elevated compression in the zone C. Thus, preferably, the depth of penetration of the blades should be selected between ⅓ and ⅔ of the thickness of the liner 42.

In the production of "pasta" the dough is prepared and processed in the mixer M at ordinary temperatures as used heretofore in the art; the same applies to the preparation of yeast-containing doughs for bakery products. It is a feature of this invention, however, that an excellent dough for bakery products may be obtained by the process described hereinbefore without the use of yeast (or yeast-substituting chemical substances) by circulating in the jacket 36 a heating fluid at a temperature in the range of about 60° C. to about 130° C. (preferably 80°–100° C.) and, above all, by supplying to the nozzle 28 the liquid ingredients (e.g. water; water-milk mixture; emulsion of edible oil in water) at a temperature within the range just indicated above. In these conditions, the starch contained in the dough is unexpectedly quickly converted to a light gel of amidopectine and at the same time yields substantial amounts amylose. The gluten contained in the flour is substantially "refractory" to hydrolysis in the above conditions. However, in order to prevent degradation of gluten to free aminoacids (some of which would confer an unpleasant taste to the bread, biscuits or the like), the residence time of the dough liner 42 at the high-temperature range mentioned hereinbefore shall advantageously be relatively short, typically not in excess of about ½ minute (preferably not more than 20 seconds) at 60°–80° C. and not in excess of about 5 seconds (preferably not more than 3 seconds) at 130° C., the residence time being in a proportion inverse to the temperature in this range. This is also the reason for which the heating jacket 36 (if present) extends through a part-length only of the barrel 10, leaving a half (or even more) of the barrel length exposed to the outer atmosphere, as shown in FIG. 1. It is to be understood that, should a process temperature in excess of 100° C. be adopted, the liquid ingredients are supplied to the nozzle 28 in pressurized condition and are expanded through the nozzle; this causes the ingredients to partly vaporize in the inlet end section of the barrel and requires a rather delicate control of the feed. It is therefore preferable to operate at a temperature of the liquid ingredient not exceeding 100° C. Temperatures of 80° C. to 100° C. are recommendable.

Surprisingly, a dough obtained by high-temperature processing according to this invention contains amylose and similar polysaccharides in amounts which are higher by 30% (and more) than the amounts obtainable from yeast-containing doughs, and, moreover, high-temperature dough pieces are successfully baked within a time period which is by 20% to even 50% less than the baking time required by a conventionally processed, yeast-containing dough. A deeper investigation has shown that the high-temperature process according to this invention not only causes the amidaceous component (starch) to quickly hydrolyse by a large extent, but also that said component undergoes at the same time a substantial "pre-cooking," so that high amounts of dextrines are obtained in the oven and the actual baking time is strongly reduced.

EXAMPLE 1

To prepare a dough for "pasta" an apparatus of the type shown in FIG. 1 is employed, comprising a barrel 10 of 80 cm. length and 113 mm. inner diameter. The shaft 14 is rotated at 1000 r.p.m. by means of a 4 H.P. motor.

220 kg./hour flour are continuously supplied to the hopper 16 and at the same time 80 kg./hour water at room temperature are continuously delivered to the nozzle 28. The residence time of the dough liner (of a thickness of about 0.5 cm.) in the barrel is about 15 seconds. About 300 kg./hour dough are continuously discharged from the mouth 12 and conveyed to a dough-rolling mill, from which strips of pasta ("fettuccine") are obtained.

EXAMPLE 2

To prepare a dough for "spaghetti" the apparatus of Example 1 is used. 220 kg./hour flour are supplied to the hopper 16 and 35 kg./hour water at room temperature are supplied to the nozzle 28. A further nozzle is provided, located closely downstream the nozzle 28, to which emulsified fresh eggs are fed at a rate of 45 kg./hour. About 300 kg./hour dough are continuously discharged from the mouth 12 and conveyed to an extruder for spaghetti.

EXAMPLE 3

A yeast-fermented dough for bread is prepared by means of an apparatus of the type shown in FIG. 1, comprising a barrel of 100 cm. length and 20 cm. inner diameter. The shaft is rotated at 850 r.p.m. 300 kg./hour flour having uniformly dispersed therein 1.5 kg. brewer's yeast are continuously supplied to the hopper 16, while 150 kg./hour water (having 5 kg. salt dissolved and 12 kg. olive oil emulsified therein are supplied at room temperature to the nozzle 28. The dough liner thickness in the barrel averages about 4 mm. and the residence time is about 25 seconds. About 450 kg./hour excellent dough are continuously discharged from the mouth 12 and conveyed to a dividing machine followed by a baking oven of a tunnel type. The baking time (residence time in the oven) is 40 minutes.

EXAMPLE 4

To prepare "grissini," a dough is formed and processed as in Example 3, except that a water-to-flour ratio of 100:55 is adopted. The dough discharged from the mouth 12 is conveyed to an extruder-divider for "grissini" and the divided lengths are baked in a tunnel oven.

EXAMPLE 5

This and the following examples illustrate preparation of dough for various types of bakery products without the use of yeast (or chemical yeast-substitutes). The apparatus is as in Example 3, with heating oil at 100° C. being circulated through the jacket 36, 250 kg./hour grain flour are continuously delivered to the hopper 16. At the same time 400 kg./hour water at 100° C. (having 2 kg. salt dissolved and 7.5 kg. olive oil emulsified therein) are supplied to the nozzle 28. The dough liner thickness averages about 0.5 cm. and the residence time is about 12 seconds. The dough discharged from the mouth 12 is divided and baked in a tunnel oven within 25 minutes. 350 kg./hour bread are obtained. The bread has an excellent cellular inner structure and a fragrant browny crust.

EXAMPLE 6

The apparatus of Example 3 is fed with 365 kg./hour water at a temperature of 98° C. and 240 kg./hour grain flour "Type O" admixed with 200 g. salt, while heating oil at about 95° C. is circulated through the jacket 36. About 600 kg./hour well grown dough are continuously discharged from the mouth 12, divided and baked in a tunnel oven. A fine bread is obtained having an excellent soft inner structure and a well formed browny crust.

EXAMPLE 7

To obtain a "yellow bread" Example 6 is repeated with the difference that maize flour is used instead of grain flour.

EXAMPLE 8

To obtain biscuits Example 6 is repeated with the difference that a 50/50 mixture of water and milk, having dissolved therein 275 g./l. sugar, is used instead of straight water. About 390 kg./hour savoury friable biscuits are obtained from the oven.

A sample of dough obtained in Example 5 was extracted (at room temperature) with distilled water and the limpid extract was analyzed with the following results:

Reducing sugars: absent;
Iodine test: positive (blue color);
Thin-layer chromatography on silica gel F 254:
    Reducing sugars: absent;
    Free aminoacids: absent;
Rf=0 with intense band (eluent:butanol+acetic acid+water).

A correspondingly tested extract from a conventionally processed, yeast-containing dough, gave a negative iodine test and no band was observed at RF=0. These results are construed in the sense that, as opposed to the conventionally processed dough, the starch in the hot-processed dough was actually hydrolyzed and pre-cooked to an extent yielding substantial amounts dextrose detected by both iodine test and chromatography.

What is claimed is:

1. Method of continuously making dough for bakery products and "pasta" from powdery and liquid ingredients mainly consisting of cereals flour and water, wherein use is made of a continuous rotary mixer comprisinng an elongate tubular barrel, a shaft coaxial with and rotatable in the barrel, passage means for feeding the ingredients to an inlet end section of the barrel, a discharge mouth in the outlet end section of the barrel, and a plurality of blades carried by said shaft in an arrangement whereby the ingredients fed to the inlet end section of the barrel will be gathered and mixed in the barrel by said blades and the resulting mixture will be conveyed from said inlet end section toward said discharge mouth, said method comprising the steps of: continuously rotating said shaft at a high centrifuging speed while feeding to said inlet end section the powdery ingredients separately of the liquid ingredients and contacting them together in said section in an atomized condition in which the ingredients are dispersed in the atmosphere in said section and are centrifuged by the blades towards the inner surface of the barrel; maintaining the feed ratio at a value insufficient for the dough being formed to fill the whole cross-sectional area of the barrel but sufficient for said dough to form on said inner surface of said barrel a tubular liner of dough furrowed by the free-end sections of the blades; and continuously discharging from said mouth the dough volumes forming the leading end of said liner.

2. Method as claimed in claim 1, wherein the centrifuging speed is kept at a value corresponding to a radial/acceleration of 40G to 80G at the tips of the blades, G being the constant of gravity.

3. Method as claimed in claim 1, wherein the thickness of the liner in the barrel is kept at a value not exceeding 20% of the inner diameter of the barrel.

4. Method as claimed in claim 1, wherein the thickness of the liner in the barrel is kept at a value not exceeding 10% of the inner diameter of the barrel.

5. Method as claimed in claim 3, wherein the blades furrows said liner to a depth of from ⅓ to ⅔ the thickness of the liner.

6. Method as claimed in claim 1 wherein; the ingredients fed to barrel are free of yeast; the water is supplied to the barrel at an elevated temperature of 60° C. to 130° C.; and the discharged dough is divided and baked to yield a bakery product.

7. Method as claimed in claim 1, wherein: the ingredients fed to the barrel are free of yeast; the water is supplied to the barrel at an elevated temperature of 80° C. to 100° C., and the discharged dough is divided and baked to yield a bakery product.

References Cited

UNITED STATES PATENTS 2,953,460   9/1960   Baker _____ 99—90 CB

RAYMOND N. JONES, Primary Examiner

U.S. Cl. X.R.

99—90 R, 92, 85; 259—185